United States Patent
Tanaka et al.

(10) Patent No.: US 10,603,687 B2
(45) Date of Patent: Mar. 31, 2020

(54) VIBRATION DATA GENERATION PROGRAM AND VIBRATION DATA GENERATION DEVICE

(71) Applicant: NIKON CORPORATION, Tokyo (JP)

(72) Inventors: Mikiya Tanaka, Chigasaki (JP); Takeshi Yagi, Tokyo (JP)

(73) Assignee: NIKON CORPORATION, Tokyo (JP)

(*) Notice: Subject to any disclaimer, the term of this patent is extended or adjusted under 35 U.S.C. 154(b) by 561 days.

(21) Appl. No.: 14/944,654

(22) Filed: Nov. 18, 2015

(65) Prior Publication Data

US 2016/0067743 A1 Mar. 10, 2016

Related U.S. Application Data

(63) Continuation of application No. PCT/JP2014/066262, filed on Jun. 19, 2014.

(30) Foreign Application Priority Data

Jun. 21, 2013 (JP) ................. 2013-130566
Jun. 21, 2013 (JP) ................. 2013-130567

(51) Int. Cl.
*B06B 1/02* (2006.01)
*G06F 3/0488* (2013.01)
(Continued)

(52) U.S. Cl.
CPC ............ *B06B 1/0269* (2013.01); *G06F 3/016* (2013.01); *G06F 3/041* (2013.01); *G06F 3/0488* (2013.01);
(Continued)

(58) Field of Classification Search
CPC ............ G01C 19/5607; G01C 19/5642; A63C 17/011; A63C 17/015; A63C 17/12
See application file for complete search history.

(56) References Cited

U.S. PATENT DOCUMENTS 9,746,924 B2 * 8/2017 Ichimura ............... G06F 3/0488
2002/0149561 A1 10/2002 Fukumoto et al.
(Continued)

FOREIGN PATENT DOCUMENTS

EP 1 310 860 A1 5/2003
JP 2002-149312 5/2002
(Continued)

OTHER PUBLICATIONS

PCT International Search Report dated Aug. 5, 2014 in corresponding International Patent Application No. PCT/JP2014/066262.
(Continued)

*Primary Examiner* — Bickey Dhakal
*Assistant Examiner* — Zoheb S Imtiaz

(57) ABSTRACT

A vibration data generation device that generates vibration data for a vibration reproduction device, which has a plurality of vibrators, in order to control each vibrators, includes an acquisition part that acquires information indicating a virtual vibration source which is input to an input part and a generation part that generates vibration data which includes a vibration pattern of each of the plurality of vibrators of the vibration reproduction device for reproducing a position of the acquired virtual vibration source.

10 Claims, 18 Drawing Sheets

(51) Int. Cl.
*H04M 1/725* (2006.01)
*G06F 3/01* (2006.01)
*G06F 3/041* (2006.01)

(52) U.S. Cl.
CPC .... *G06F 3/04883* (2013.01); *H04M 1/72522* (2013.01)

(56) References Cited

U.S. PATENT DOCUMENTS

| | | | | |
|---|---|---|---|---|
| 2010/0013613 A1* | 1/2010 | Weston | ............... | G06F 3/016 340/407.2 |
| 2010/0238116 A1* | 9/2010 | Shin | ............... | G06F 3/016 345/168 |
| 2011/0157052 A1* | 6/2011 | Lee | ............... | G06F 1/1626 345/173 |
| 2014/0184540 A1* | 7/2014 | Fukuoka | ............... | G06F 3/0416 345/173 |
| 2014/0298908 A1* | 10/2014 | Ichikawa | ............... | G01P 3/16 73/504.12 |
| 2014/0375602 A1* | 12/2014 | Fujiune | ............... | G06F 3/016 345/174 |
| 2016/0258758 A1* | 9/2016 | Houston | ............... | G01C 21/20 |

FOREIGN PATENT DOCUMENTS

| | | |
|---|---|---|
| JP | 2007-215051 | 8/2007 |
| JP | 2009-122011 | 6/2009 |

OTHER PUBLICATIONS

PCT Written Opinion of the International Searching Authority dated Aug. 5, 2014 in corresponding International Patent Application No. PCT/JP2014/066262.

Japanese Office Action dated Aug. 15, 2017 in corresponding Japanese Patent Application No. 2015-522971.

\* cited by examiner

VIBRATION DATA GENERATION PROGRAM AND VIBRATION DATA GENERATION DEVICE

CROSS-REFERENCE TO RELATED APPLICATION

Priority is claimed on Japanese Patent Application No. 2013-130566, filed Jun. 21, 2013, and Japanese Patent Application No. 2013-130567, filed Jun. 21, 2013. The present application is a continuation application of International Application PCT/JP2014/066262, filed on Jun. 19, 2014. The contents of the above applications are incorporated herein.

BACKGROUND

Technical Field

The present invention relates to a vibration data generation program and a vibration data generation device.

As represented by a mobile phone, terminal devices provided with a vibrator have become widespread. A vibration pattern by the vibrator is often pre-stored in a storage unit of the terminal device.

If a user can generate a desired vibration pattern in this state, a use form of the device is expected to be widened.

In Japanese Unexamined Patent Application, First Publication No. 2007-215051, an information communication terminal for generating data of a vibration pattern for causing a vibration means to vibrate based on a detection result of an acceleration detection means for detecting acceleration and saving the vibration pattern in the data storage means is disclosed.

In addition, a tactual vibration clock for providing time information based on tactile sensation is known (for example, see Japanese Unexamined Patent Application, First Publication No. 2009-122011). The tactual vibration clock includes a clock substrate in which 12 tactual units mutually separately positioned in a circumferential direction are provided on a surface, vibrating means configured to vibrate each of the 12 tactual units, clock means configured to measure the time, and vibrating control means configured to control the vibrating means to selectively vibrate each of the 12 tactual units in correspondence with the measured time value. In addition, the tactual vibration clock includes at least one display device of an analog type and a digital type for providing time information based on visual sensation.

SUMMARY

However, a conventional device merely performs a simple process of replacing acceleration applied to the device with vibration, and does not reproduce a user-desired vibration pattern, for example, a vibration pattern or the like associated with movement of a vibration source (including a virtual vibration source).

According to an aspect of the present invention, one of an objective is to generate vibration data for enabling a vibration pattern to be reproduced associated with movement of a vibration source.

In addition, in the conventional tactual vibration clock, the user can only know which tactual unit vibrates by viewing time information, and does not obtain information about more complex vibration.

According to another aspect of the present invention, one of an objective is to provide information about more complex vibration.

According to an aspect of the present invention, a vibration data generation device is provided that generates vibration data for a vibration reproduction device, which has a plurality of vibrators, in order to control each vibrators, the vibration data generation device including: an acquisition part that acquires information indicating a virtual vibration source which is input to an input part; and a generation part that generates vibration data which includes a vibration pattern of each of the plurality of vibrators of the vibration reproduction device for reproducing a position of the acquired virtual vibration source.

According to another aspect of the present invention, a vibration data generation program is provided for causing a computer to generate vibration data for a vibration reproduction device, which has a plurality of vibrators, in order to control each vibrators, the vibration data generation program causing the computer to execute: a process of acquiring information indicating a virtual vibration source which is input to an input part; and a process of generating vibration data which includes a vibration pattern of each of the plurality of vibrators of the vibration reproduction device for reproducing a position of the acquired virtual vibration source.

According to an aspect of the present invention, it is possible to generate vibration data for enabling a vibration pattern to be reproduced associated with movement of a vibration source.

In addition, according to another aspect of the present invention, it is possible to provide information about more complex vibration.

DESCRIPTION OF THE EMBODIMENTS

Hereinafter, embodiments of a vibration data generation device and a vibration data generation program of the present invention will be described with reference to the drawings.

<Vibration Reproduction Device>

Figure 1:
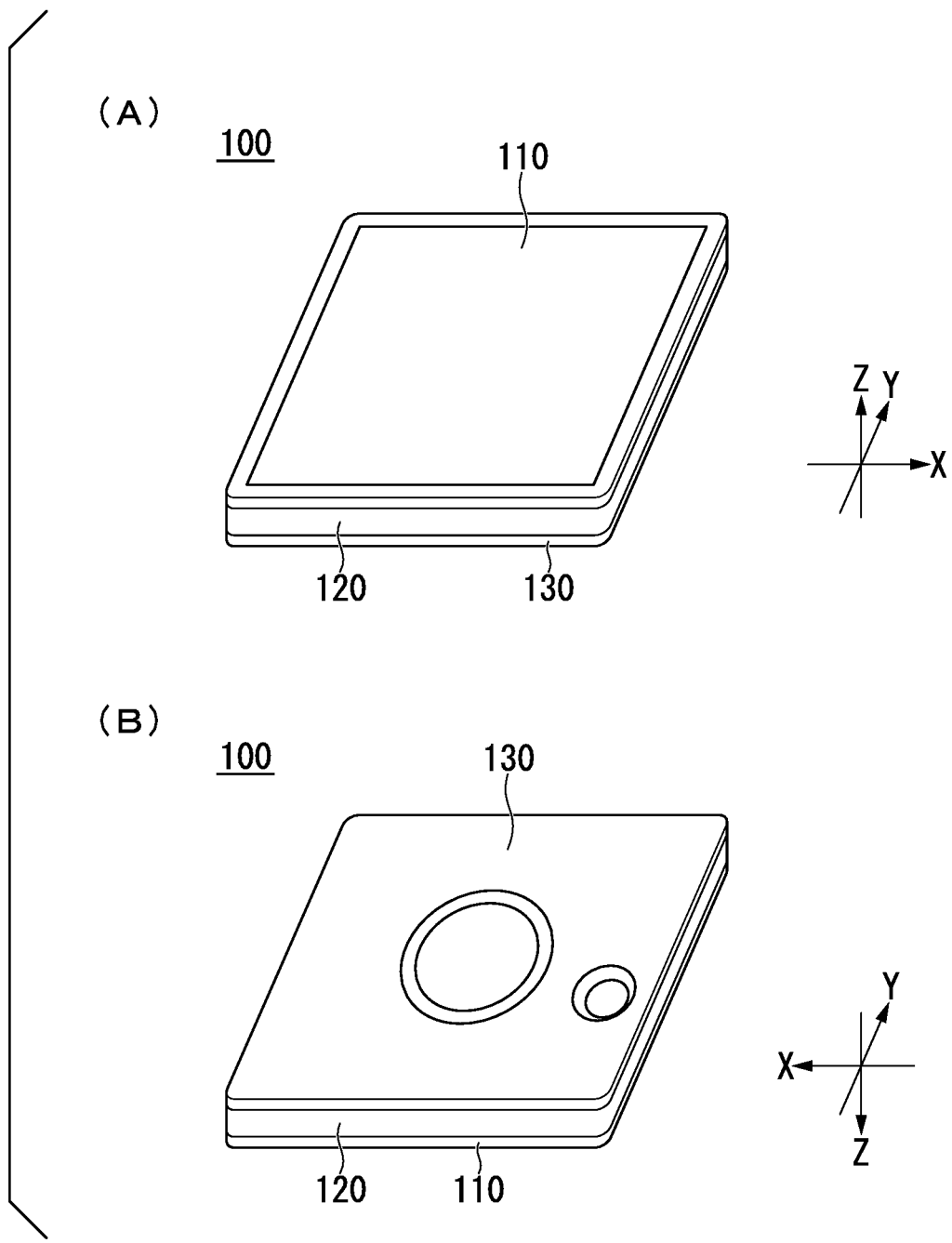
FIG. 1 is a view illustrating an example of an exterior configuration of a vibration reproduction device.
Figure 2:
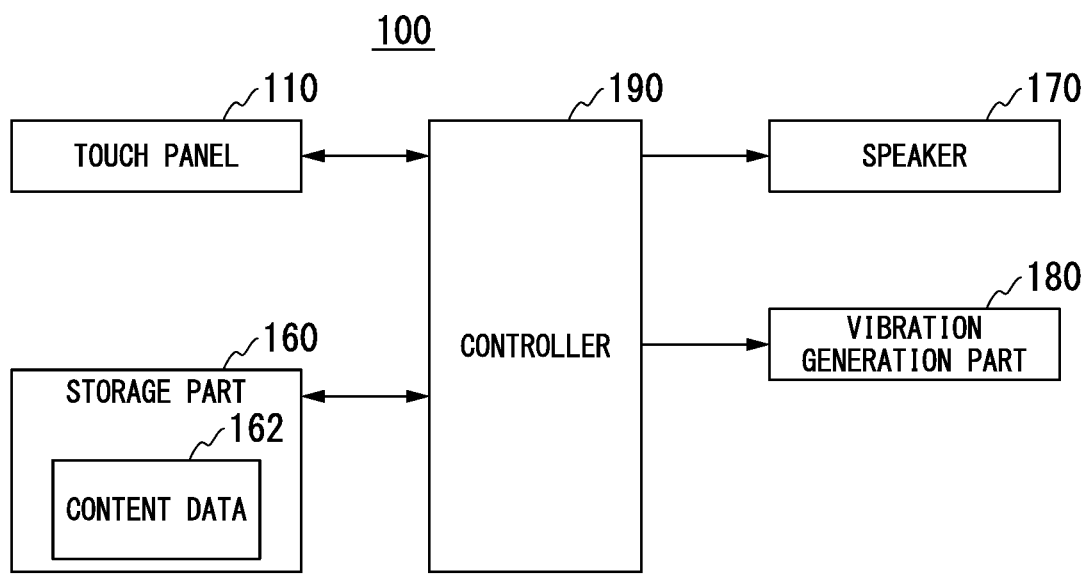
FIG. 2 is a view illustrating an example of a functional configuration of the vibration reproduction device.

The vibration reproduction device for reproducing vibration data generated by a vibration data generation device of this embodiment will be described. FIG. 1 is a view illustrating an example of an exterior configuration of a vibration reproduction device 100. FIG. 2 is a view illustrating an example of a functional configuration of the vibration reproduction device 100.

Hereinafter, a configuration of the vibration reproduction device 100 will be described using an XYZ orthogonal coordinate system. The XYZ orthogonal coordinate system is a coordinate system based on the vibration reproduction device 100. In the XYZ orthogonal coordinate system, a stack direction of each component of the vibration reproduction device 100 is assumed to be a Z direction. In addition, a plane orthogonal to the Z direction is designated as an XY plane and orthogonal directions in the XY plane are assumed to be X and Y directions.

The vibration reproduction device 100, for example, has substantially a rectangular shape in a Z-direction view, and includes a configuration in which a touch panel 110, a main body part 120, and a back cover 130 are stacked in the Z direction. FIG. 1(A) is a view of the vibration reproduction device 100 viewed from the side of the touch panel 110 and FIG. 1(B) is a view of an electronic device viewed from the side of the back cover 130.

The main body part 120 stores a storage part 160, a speaker 170, a vibration generation part 180, a controller 190, etc. illustrated in FIG. 2 within a housing. In addition, the main body part 120 may store a camera, a communication device, an input/output (I/O) (an I/O port, an I/O interface), an acceleration sensor, a power-supply circuit, a battery, a Global Positioning System (GPS) receiver, etc. within the housing.

In the storage part 160, content data 162, etc. is stored in addition to a program (firmware) to be executed by a central processing unit (CPU) of the controller 190 and a calculation result of performing a calculation process by the CPU.

The speaker 170 outputs sound based on sound data generated by the controller 190.

Figure 3:
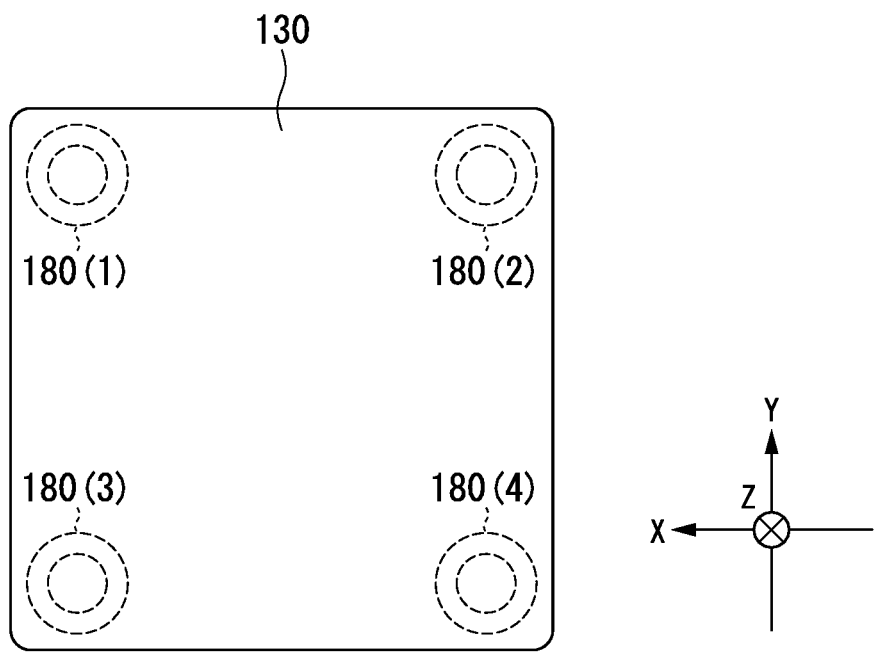
FIG. 3 is a view illustrating an example of arrangement positions of vibrators in the vibration reproduction device and is a partial perspective view when the vibration reproduction device is viewed from a back cover side.

The vibration generation part 180 generates vibration based on vibration data generated by the controller 190. The vibration generation part 180 includes a plurality of vibrators. FIG. 3 is a view illustrating an example of arrangement positions of vibrators 180(1) to 180(4) in the vibration reproduction device 100 and is a partial perspective view when the vibration reproduction device 100 is viewed from the side of a back cover 130.

As illustrated in FIG. 3, the vibration generation part 180, for example, includes vibrators 180(1), 180(2), 180(3), and 180(4) arranged in the vicinity of four corners of the vibration reproduction device 100. Each vibrator, for example, is attached to the back cover 130. As the vibrator, for example, a voice coil motor (VCM), an eccentric motor, or the like is used. When the voice coil motor is used, each vibrator, for example, generates the vibration of the Z direction. Also, the arrangement of the vibrators is not limited to that illustrated in FIG. 3, and the vibrators may be arranged in another arrangement.

According to the related configuration, the vibration reproduction device 100, for example, can transfer vibration to the user's palm or display an image on the touch panel 110 in a state in which the user holds the back cover 130 in the palm. In addition, because vibration generated by the vibration generation part 180 is transferred to the side of the touch panel 110, vibration corresponding to a contact position can be transferred to a finger when the user touches the touch panel 110 with the finger.

Figure 4:
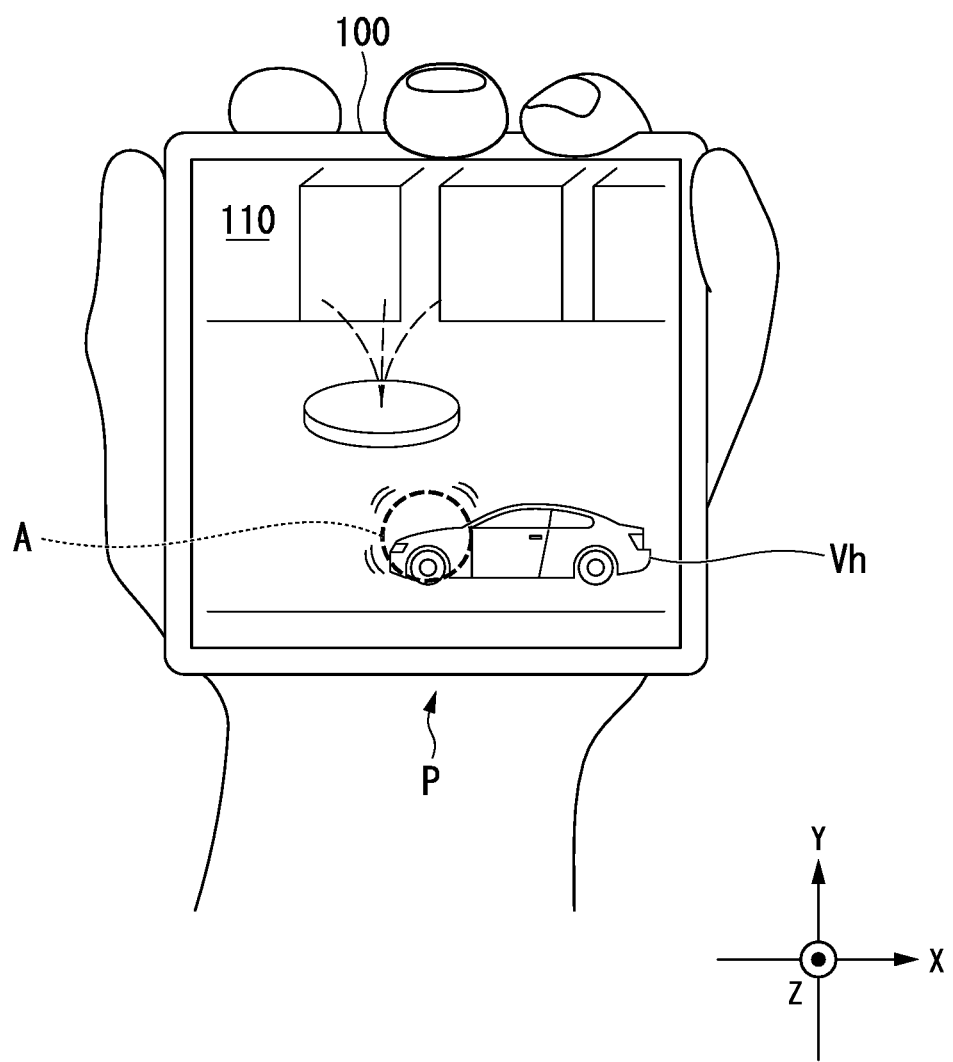
FIG. 4 is a view illustrating a state in which the vibration reproduction device is held by the user's palm and used.

FIG. 4 is a view illustrating a state in which the vibration reproduction device 100 is held in the user's palm P and used. In FIG. 4, the vibration reproduction device 100 displays a landscape in which a vehicle Vh travels through town.

Figure 5:
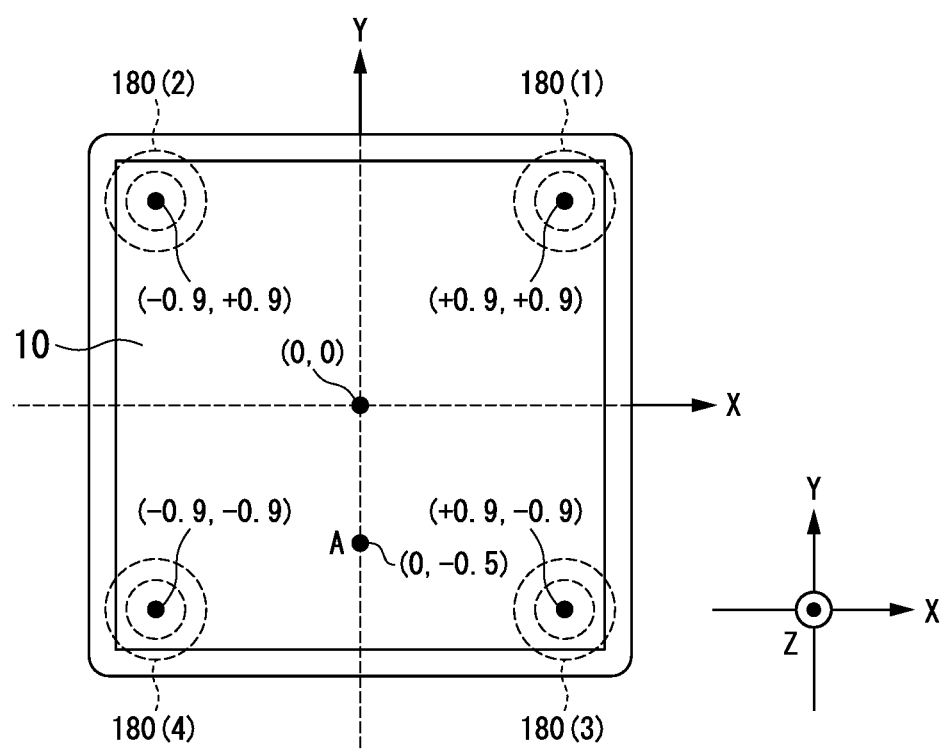
FIG. 5 is a view illustrating an example of a position of a virtual vibration source felt by the user.

The vibration reproduction device 100 having the four vibrators 180(1) to 180(4) can enable the user to feel a virtual vibration source by phantom sensation. FIG. 5 is a view illustrating an example of a position A of a virtual vibration source felt by the user. The position A of the virtual vibration source, for example, is a center of gravity obtained by weighting positions of a plurality of vibrators 180(1) to 180(4) by amplitudes of the each vibrator.

In the example of FIG. 5, a coordinate system (x, y)=(−1.0 to +1.0, −1.0 to +1.0) having the center point of the vibration reproduction device 100 as the origin is set. In this coordinate system, coordinates of the vibrator 180(1) are set as (x, y)=(+0.9, +0.9), coordinates of the vibrator 180(2) are set as (x, y)=(−0.9, +0.9), coordinates of the vibrator 180(3) are set as (x, y)=(+0.9, −0.9), coordinates of the vibrator 180(4) are set as (x, y)=(−0.9, −0.9), and coordinates of the position A of the virtual vibration source are set as (x, y)=(0, −0.5).

In the case of the setting described above, the controller 90, for example, enables the user holding the vibration reproduction device 100 in the state of FIG. 4 to feel that vibration is generated in the vicinity of the position A of the virtual vibration source by causing the vibrator 180(1) to vibrate at an amplitude of 0.45×K (reference amplitude), causing the vibrator 180(3) to vibrate at an amplitude of 0.55×K, and causing the vibrator 180(4) to vibrate at an amplitude of 1×K. Also, in this setting, the vibrator 180(2) is not vibrated (an amplitude of 0×K).

That is, the user can feel vibration when the vibration is generated in the vicinity of coordinates (x, y)=(0, −0.5) of the position A of the virtual vibration source by adding or subtracting each of an X-direction vibration component and a Y-direction vibration component of each vibrations coming from the vibrators 180(1) to 180(4) as shown in the following Formulas (1) and (2). Formula (1) shows addition/ subtraction of each vibration of the vibrators 180(1) to 180(4) in the X-direction component. Formula (2) shows addition/subtraction of each vibration of the vibrators 180(1) to 180(4) in the Y-direction component.

X component:

$$\{+0.9\times0.45\times K+0.9\times0.55\times K-0.9\times1\times K\}/(0.45+0.55+1)$$
$$K=0 \quad \text{Formula (1)}$$

Y component:

$$\{+0.9\times0.45\times K+0.9\times0.55\times K-0.9\times1\times K\}/(0.45+0.55+1)$$
$$K\approx-0.5 \quad \text{(Formula 2)}$$

In the above-described Formula (1), the vibration of the vibrator 180(1) corresponds to the term (+0.9×0.45×K), the vibration of the vibrator 180(3) corresponds to the term (+0.9×0.55×K), and the vibration of the vibrator 180(4) corresponds to the term (−0.9×1×K).

In the above-described Formula (2), the vibration of the vibrator 180(1) corresponds to the term (+0.9×0.45×K), the vibration of the vibrator 180(3) corresponds to the term (−0.9×0.55×K), and the vibration of the vibrator 180(4) corresponds to the term (−0.9×1×K).

The vibration reproduction device 100 enables the user to feel like that vibration is moving by changing the intensity of vibration of each vibrator to move the position A of the virtual vibration source. The vibration reproduction device 100 moves the position A of the virtual vibration source in association with the movement of the vibration source (for example, an engine of a vehicle Vh) displayed on the touch panel. In the example of FIG. 4, the vibration reproduction device 100 temporally changes the intensity of vibration of each vibrator so that an engine portion of the vehicle Vh is at the position A of the virtual vibration source when the vehicle Vh has moved from the right to the left in an image. Thereby, the vibration reproduction device 100 can provide the user with a more advanced realistic sensation.

<Vibration Data Generation Device>

[Configuration]

The vibration data generation device 1, for example, functions through dedicated software (vibration data generation program) installed in a terminal device such as a personal computer. The vibration data generation program, for example, is assumed to be a part of an authoring tool for associating a moving image and/or music with vibration in time series and generating reproducible content data in linkage with the moving image and/or music associated with the vibration. The vibration data generation device 1 is connected to the vibration reproduction device 100 through a communication cable or performs wireless communication to transmit vibration data to the vibration reproduction device 100.

Figure 6:
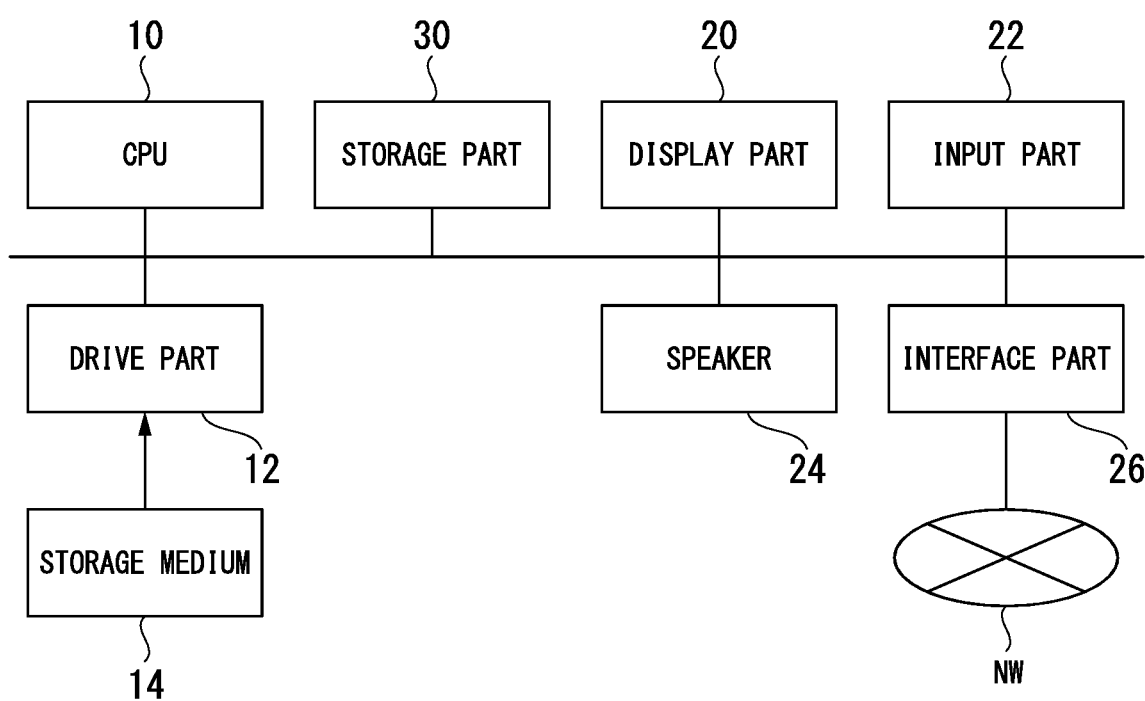
FIG. 6 is a view illustrating an example of a hardware configuration of the vibration data generation device.

FIG. 6 is a view illustrating an example of a hardware configuration of the vibration data generation device 1. The vibration data generation device 1, for example, includes a CPU (a processor, a circuit, circuitry, processing circuitry) 10, a drive part (a driver) 12, a display part (a display) 20, an input part (an input device) 22, a speaker 24, an interface part (an interface) 16, and a storage part (a memory) 30.

The CPU 10 executes various types of programs stored in the storage part 30. The drive part 12 is equipped with a storage medium 14 such as a Universal Serial Bus (USB) memory, a compact disc (CD), a digital versatile disc (DVD), or a Secure Digital (SD) card.

The storage part 30, for example, includes a hard disk drive (HDD), a flash memory, a read only memory (ROM), a random access memory (RAM), a register, or the like.

The display part 20 is a liquid crystal display device, an organic electroluminescence (EL) display device, or the like.

The input part 22 is a keyboard, a mouse, a touch pad, or another input device. Also, the display part 20 may be constituted of the touch panel and function as an input device.

The interface part 26 is a device for connecting to a network NW such as the Internet, and includes a network card or the like.

Figure 7:
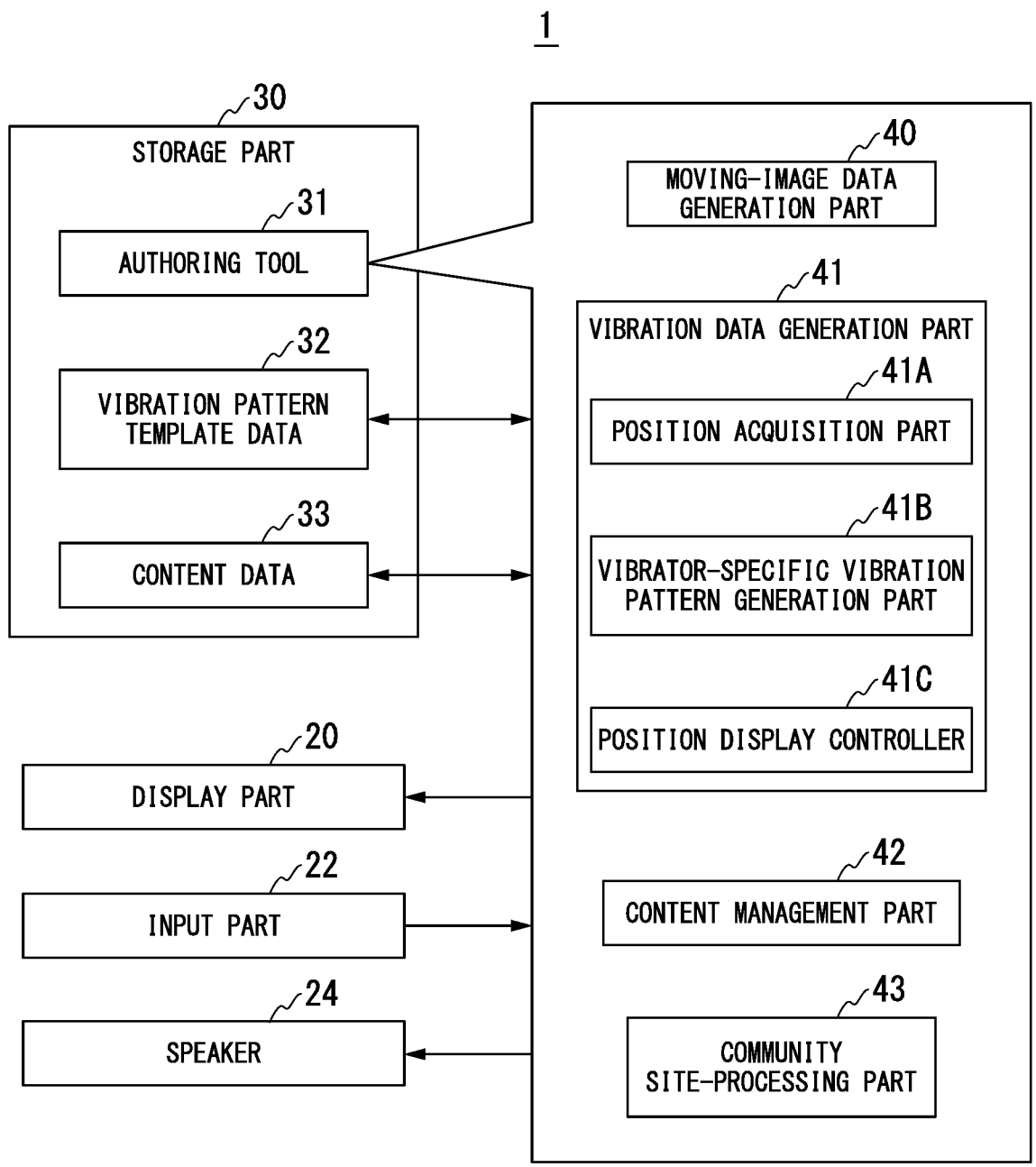
FIG. 7 is a view illustrating an example of a functional configuration of the vibration data generation device.

FIG. 7 is a view illustrating an example of a functional configuration of the vibration data generation device 1. The storage part 30 stores an authoring tool 31. In addition, the storage part 30 stores vibration pattern template data 32 which is a vibration pattern corresponding to movement between partial areas (as will be described below) of the virtual vibration source to be used by the authoring tool 31, content data 33 generated by the authoring tool 31, etc.

The vibration pattern template data 32, for example, is stored in the storage part 30 with the authoring tool 31 when the authoring tool 31 is installed in the vibration data generation device 1.

The authoring tool 31 may be acquired from another computer via the network NW by the interface part 26 and installed or may be installed from the storage medium 14 mounted on the drive part 12.

As a function unit to function when the CPU 10 executes the authoring tool 31, the vibration data generation device 1 includes a moving-image data generation part (a moving-image data generation circuit) 40, a vibration data generation part (a vibration data generation circuit) 41, a content management part (a content management circuit) 42, and a community site-processing part (a community site-processing circuit) 43. The vibration data generation part 41 includes a position acquisition part (a position acquisition circuit) 41A, a vibrator-specific vibration pattern generation part (vibrator-specific vibration pattern generation circuit) 41B, and a position display controller 41C.

[Moving-image Data Generation]

The authoring tool 31 makes the display part 20 to display a moving-image data generation screen, a vibration data generation screen, a content management screen, and a community site screen as rough classifications.

Figure 8:
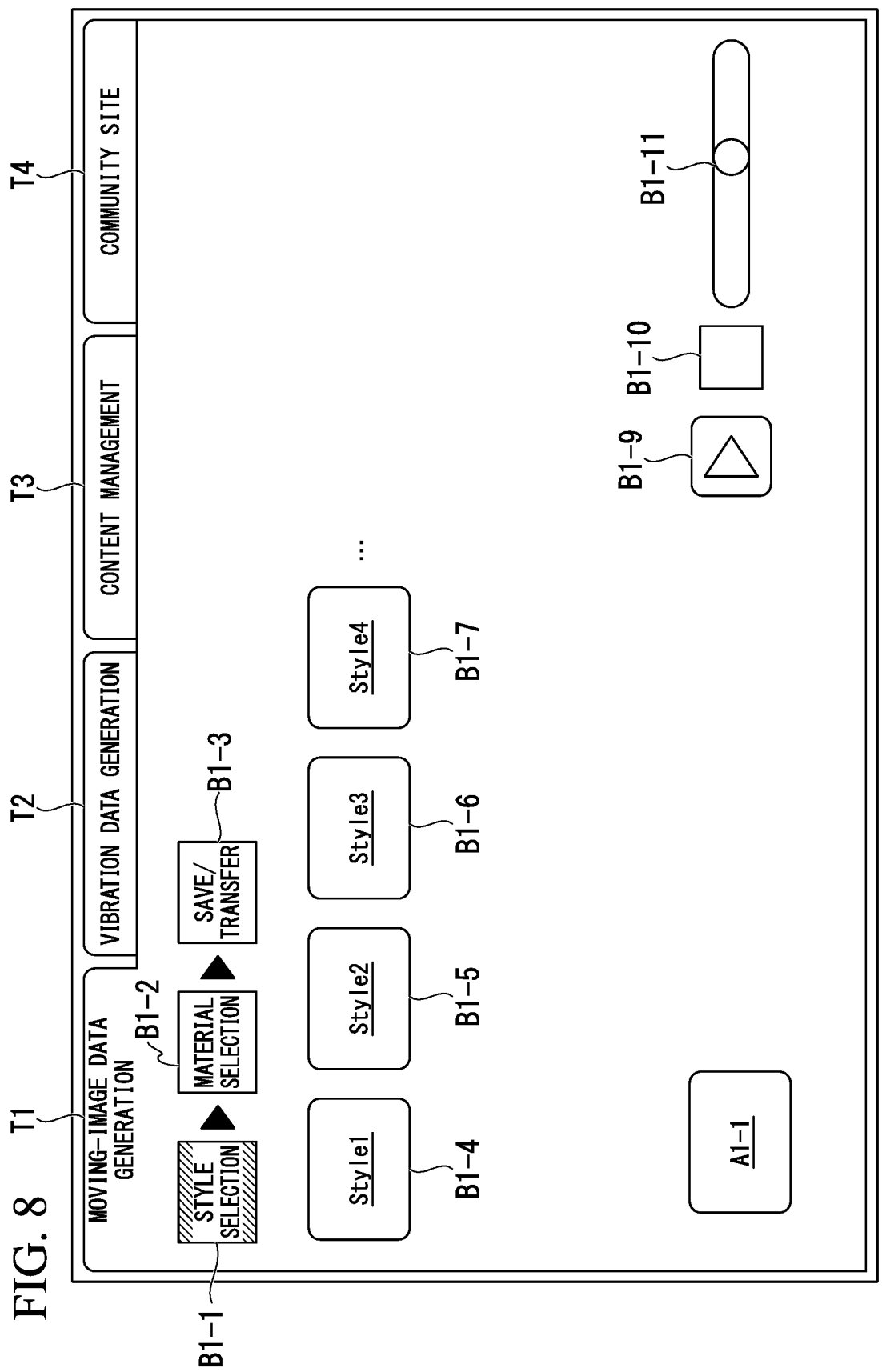
FIG. 8 is a view illustrating an example of a moving-image data generation screen.

FIG. 8 is a view illustrating an example of a moving-image data generation screen. When a tab T1 common to each screen is operated (clicked by a mouse, tapped, or the like), the moving-image data generation part 40 is activated and the moving-image data generation screen is displayed. The generation of moving-image data, for example, is performed in the flow of style selection→material selection→save/transfer. The style indicates prepared content into which a moving image, sound, and vibration are integrated. FIG. 8 illustrates a display screen (style selection screen) when the style selection is performed. In the moving-image data generation screen, a style selection button B1-1 for displaying a style selection screen, a material selection button B1-2 for displaying a material selection screen, and a save/transfer button B1-3 for displaying a save/transfer screen are provided.

In addition, in the style selection screen, style selection buttons B1-4 to B1-7 for selecting a style to perform creation or editing are provided. When the user operates any style selection button, a representative image of the style corresponding to the selected style selection button is displayed in an area A1-1. When the preview button B1-9 is operated in this state, the moving image and sound to be included in the selected style are synchronized and reproduced in arbitrary area.

Also, the user can switch ON/OFF of an output of the sound by operating a mute button B1-10. In addition, the user can adjust a volume by performing a slide operation (for example, an operation of moving to the left/right in the clicked state using the mouse) on a volume adjustment knob B1-11.

Figure 9:
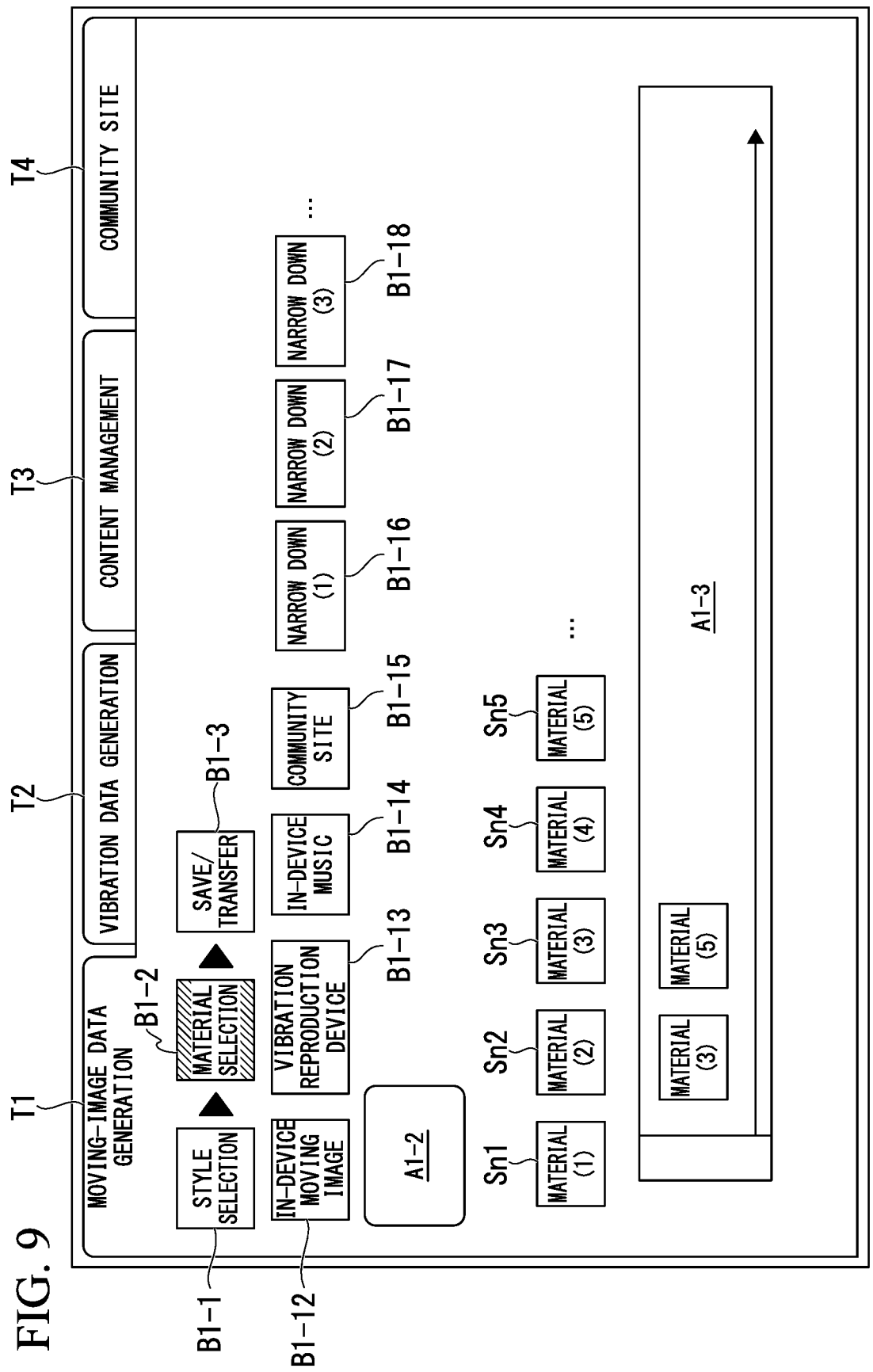
FIG. 9 is a view illustrating an example of a material selection screen.

When the user operates the material selection button B1-2, the material selection screen is displayed. FIG. 9 is a view illustrating an example of the material selection screen. In an area A1-2 in the material selection screen, a representative image of the style selected in the style selection screen is displayed. In addition, in the material selection screen, buttons B1-12 to B1-15 for designating whereabouts of the material are provided. When the user operates the button B1-12, a list of moving-image data stored in the storage part 30 by the vibration data generation device 1 is displayed. In addition, when the user operates the button B1-13, the content data 162 stored in the storage part 160 by the vibration reproduction device 100 having a communication connection to the vibration data generation device 1 is read and its list is displayed. In addition, when the user operates the button B1-14, a list of music stored in the storage part 30 by the vibration data generation device 1 is displayed. In addition, when the user operates the button B1-15, a list of moving images or music capable of being downloaded from the community site (as will be described below) is displayed.

The moving images or music displayed in the list as described above can be narrowed down through narrow-down buttons B1-16 to B1-18. Narrowing down, for example, can be performed based on whether to include a still image, whether to include a moving image, whether to include material owned by the user himself/herself, and whether to include material owned by a third party other than the user. In addition, in the material selection screen, the order of materials can be changed based on dates or the like on which materials are imaged. In addition, in the material selection screen, thumbnail images Sn1 to Sn5, etc. of materials capable of being included in the style are displayed. When the user selects thumbnail images of a desired material, the selected thumbnail images of the material are displayed in an area A1-3 in time series (in order of reproduction).

Figure 10:
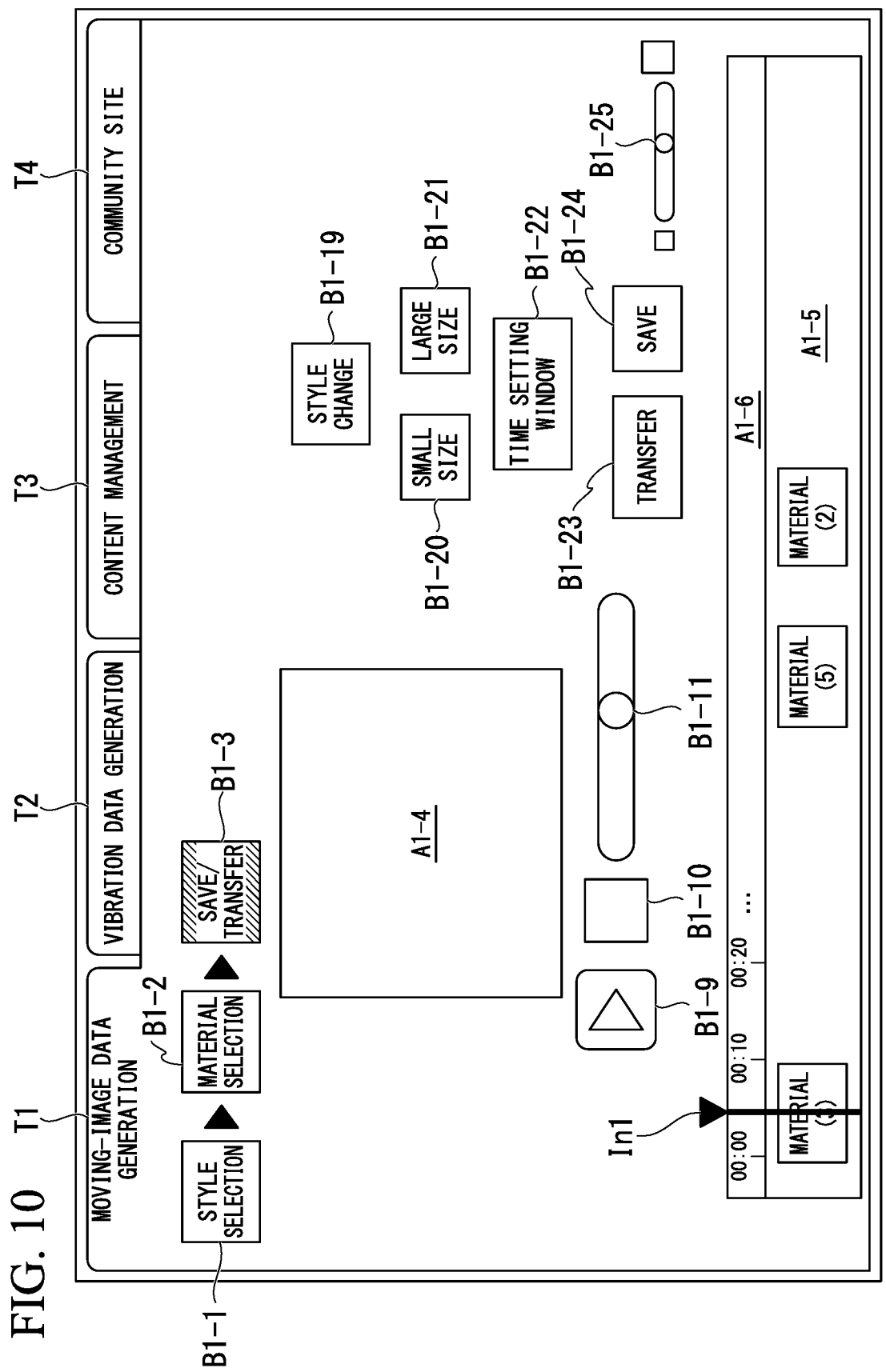
FIG. 10 is a view illustrating an example of a save/transfer screen.

When the user operates the save/transfer button B1-3, the save/transfer screen is displayed. FIG. 10 is a view illustrating an example of the save/transfer screen. In the save/transfer screen, as in the style selection screen, a preview button B1-9, a mute button B1-10, and a volume adjustment knob B1-11 are provided and the reproduction of a moving image and sound included in the selected style, ON/OFF switching of the sound, and volume adjustment are possible. The moving image is reproduced in an area A1-4.

Also, a "position A of a virtual vibration source" as will be described below may be superimposed and displayed in synchronization with a reproduction time with respect to the moving image to be reproduced in the area A1-4. In addition, in the save/transfer screen, the thumbnail image of the material included in the selected style is displayed in an area A1-5 with the elapsed time from a reproduction start time of the style shown in an area A1-6. In the areas A1-5 and A1-6, an indicator In1 is superimposed and displayed in linkage with the elapsed time of the moving image to be reproduced by operating the preview button B1-9.

In addition, in the save/transfer screen, a style change button B1-19, a small size designation button B1-20, a large size designation button B1-21, a time setting window B1-22, a transfer button B1-23, a save button B1-24, and a thumbnail enlargement/reduction knob B1-25 are provided. The user can cause the screen to transition to the style selection screen and reselect the style by operating the style change button B1-19. In addition, the user can set the size of a moving image to be created to a large or small size by operating the small size designation button B1-20 or the large size designation button B1-21. In addition, the user can set a time length of the moving image to be created by inputting a value to the time setting window B1-22. For the time length of the moving image, an initial value is set in a length of music of the moving image when the music is included in the style. In addition, the user can transfer a style currently being edited to the vibration reproduction device 100 without saving the style in the vibration data generation device 1 by operating the transfer button B1-23. In addition, the user can save the completed style as content data 33 in the storage part 30 of the vibration data generation device 1 by operating the save button B1-24. At this time, vibration data preset for every style is assigned to the style. In addition, it is possible to enlarge or reduce a thumbnail image displayed in the area A1-5 by operating the thumbnail enlargement/reduction knob B1-25.

[Vibration Data Generation]

Figure 11:
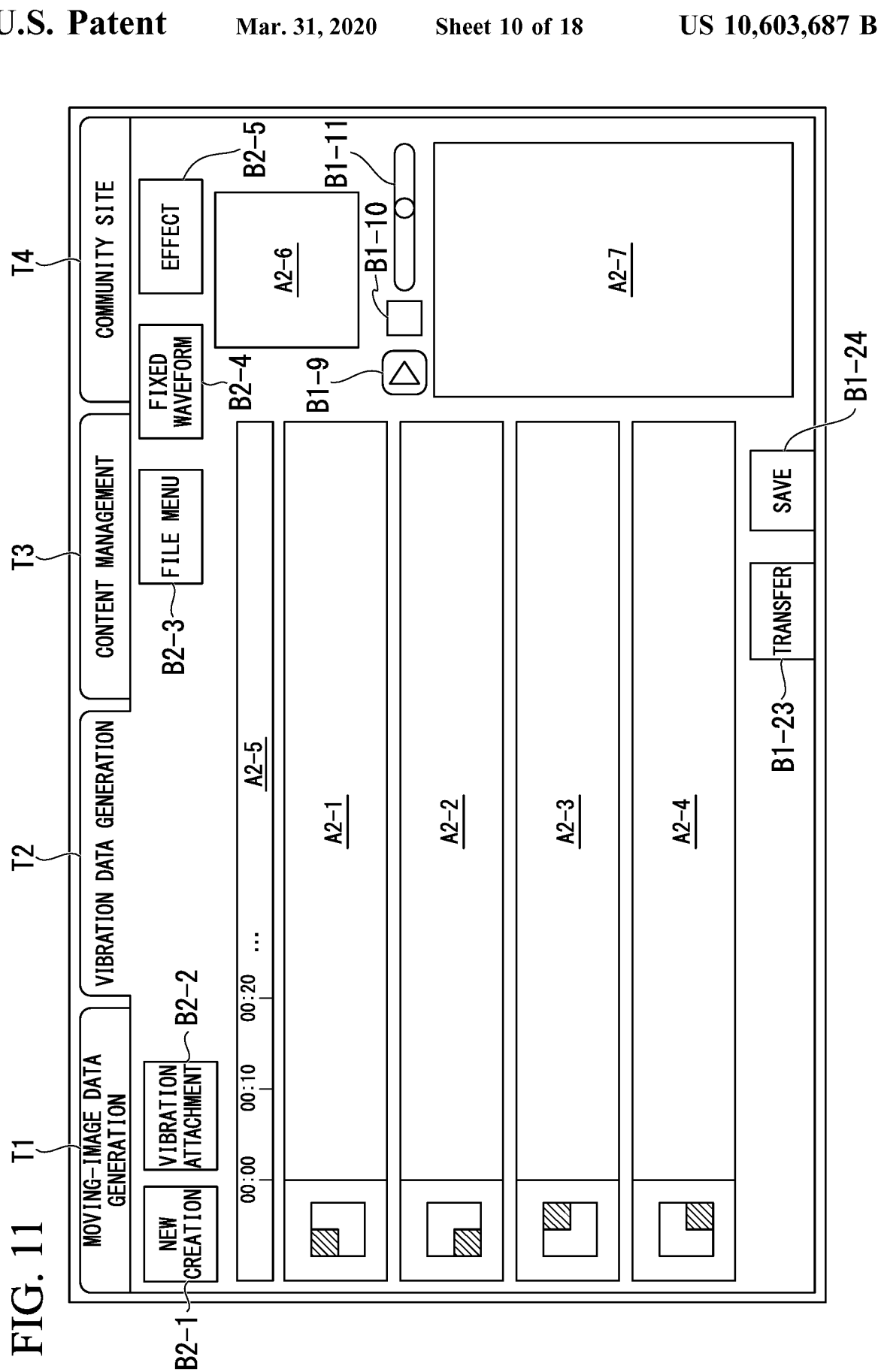
FIG. 11 is a view illustrating an example of a vibration data generation screen.

When a tab T2 is operated, the vibration data generation part 41 is activated and the vibration data generation screen is displayed. FIG. 11 is a view illustrating an example of the vibration data generation screen. In the vibration data generation screen, a new creation button B2-1 and a vibration attachment button B2-2 are provided. The user can newly create vibration data by operating the new creation button B2-1.

In addition, the user can attach the created vibration data to a moving image by operating the vibration attachment button B2-2. The creation of the vibration data is performed by editing any one of (A) vibration data converted from music data, (B) vibration data created based on a style, (C) fixed wave data, and (D) vibration data converted from line input recording. The vibration data, for example, can be saved as a format of a vibration-attached moving image file having an extension of ".mov" or a format of a vibration file having an extension of ".vib." In addition, in the vibration data generation screen, a file menu display button B2-3, a fixed waveform selection button B2-4, and an effect button B2-5 are provided. The user can display a list of vibration data by operating the file menu display button B2-3 (corresponding to the vibration data of the above-described (A) and (B)). In addition, the user selects the fixed waveform selection button B2-4, thereby generating initial data of vibration data by inputting fixed wave information or designating vibration data converted from the line input recording as initial data (corresponding to vibration data of the above-described (C) and (D)).

When the initial data of the vibration data is generated by inputting fixed wave information, the user can set a type of waveform (for example, a rectangular wave or sine wave), amplitude, a frequency, a time length, the presence/absence of a tone burst, the number of rings, the number of stops, a mode (a uniform wave, a fade-in wave, or a fade-out wave), etc.

A case in which the vibration data is newly created by the vibration data generation part 41 and the created vibration data is attached to a moving image has been described here, but not only newly creating the vibration data but also the vibration data generation part 41 may be configured to edit the vibration data which is included in the vibration-attached moving-image file.

In addition, in the vibration data generation screen, areas A2-1 to A2-4 for displaying vibration patterns corresponding to the vibrators 180(1) to 180(4) of the vibration reproduction device 100 are provided. In the area A2-1, a vibration pattern corresponding to the vibrator 180(2) positioned at the upper left when the vibration reproduction device 100 is viewed from the side of the touch panel 110 is displayed with the elapsed time from the reproduction start time of vibration displayed in an area A2-5 (preview display). In addition, a vibration pattern corresponding to the vibrator 180(4) positioned at the lower left is displayed in the area A2-2, a vibration pattern corresponding to the vibrator 180(1) positioned at the upper right is displayed in the area A2-3, and a vibration pattern corresponding to the vibrator 180(3) positioned at the lower right is displayed in the area A2-4.

Figure 12:
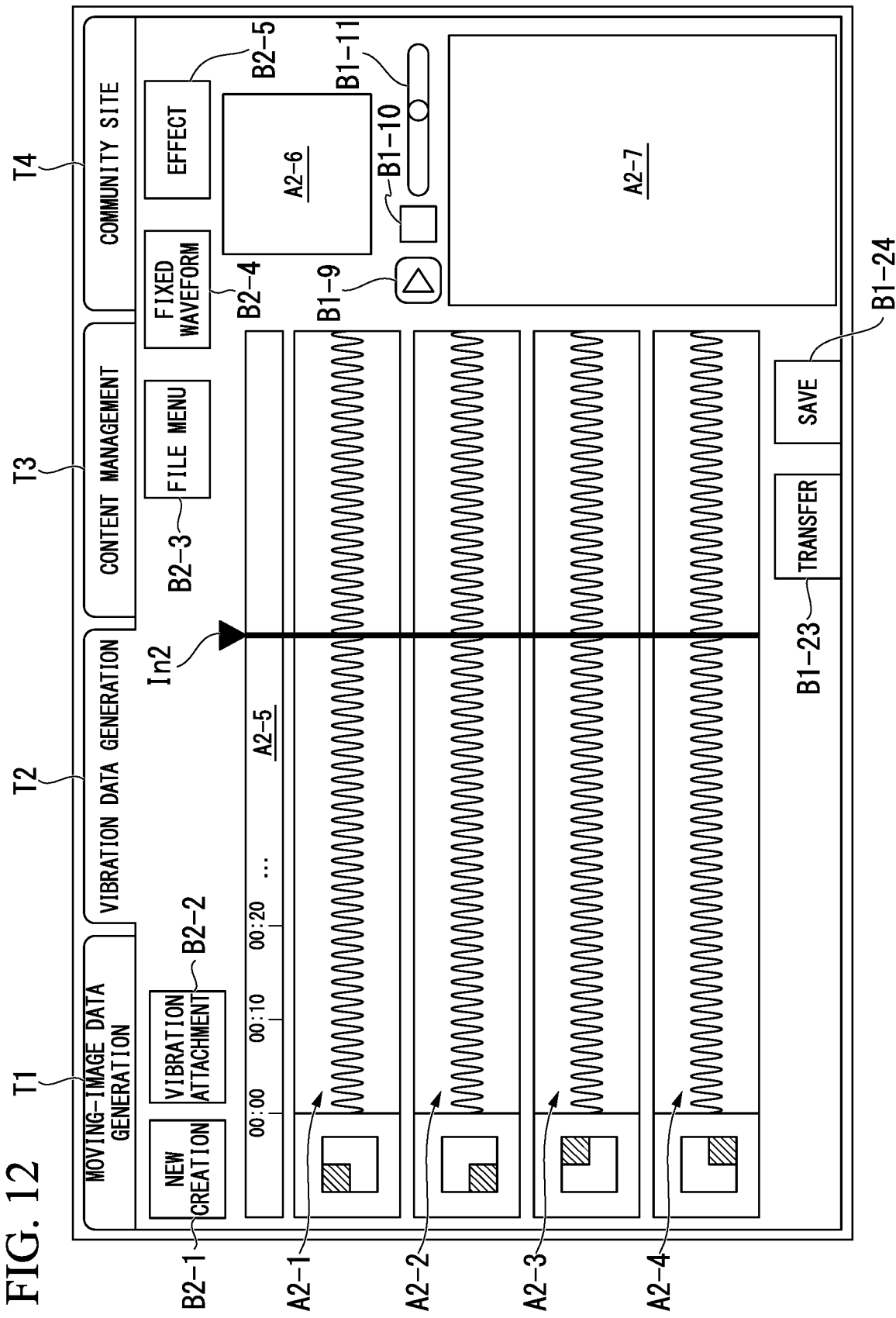
FIG. 12 is a view illustrating a state in which vibration patterns are displayed in areas A2-1 to A2-4 at a point in time at which certain vibration data is selected as initial data.

FIG. 12 is a view illustrating a state in which vibrator-specific vibration patterns are displayed in the areas A2-1 to A2-4 at a point in time at which certain vibration data is selected as initial data. The user can perform silencing (setting the amplitude of a selected part to zero), trimming (shortening a time axis by trimming the selected part), gain adjustment, and processing of a high-pass/low-pass filter or the like on a part or all of the displayed vibration patterns by operating the effect button B2-5.

The user can designate a target period in which this effect processing or a process of reflecting a movement locus of a virtual vibration source as will be described below in a vibration pattern is performed, for example, by inputting diagonal ends of a rectangle using the mouse (clicking the upper left, stopping the click after movement to the lower right, or the like).

In addition, in the vibration data generation screen, a transfer button B1-23 and a save button B1-24 similar to those of the moving-image data generation screen are provided. In addition, in the vibration data generation screen, an area A2-6 in which a moving image is reproduced, and a preview button B1-9, a mute button B1-10, and a volume adjustment knob B1-11 similar to those of the moving-image data generation screen are provided. When a moving image is reproduced through the preview button B1-9, an indicator In2 may be superimposed on the areas A2-1 to A2-4 in linkage with the elapsed time of a reproduced moving image and displayed.

(Vibration Data Generation Corresponding to Movement Locus)

In addition, in the vibration data generation screen, a movement locus input area A2-7 for inputting a locus of a position of a virtual vibration source (hereinafter referred to as a "movement locus"; the movement locus may include a stationary "position") is provided.

Figure 13:
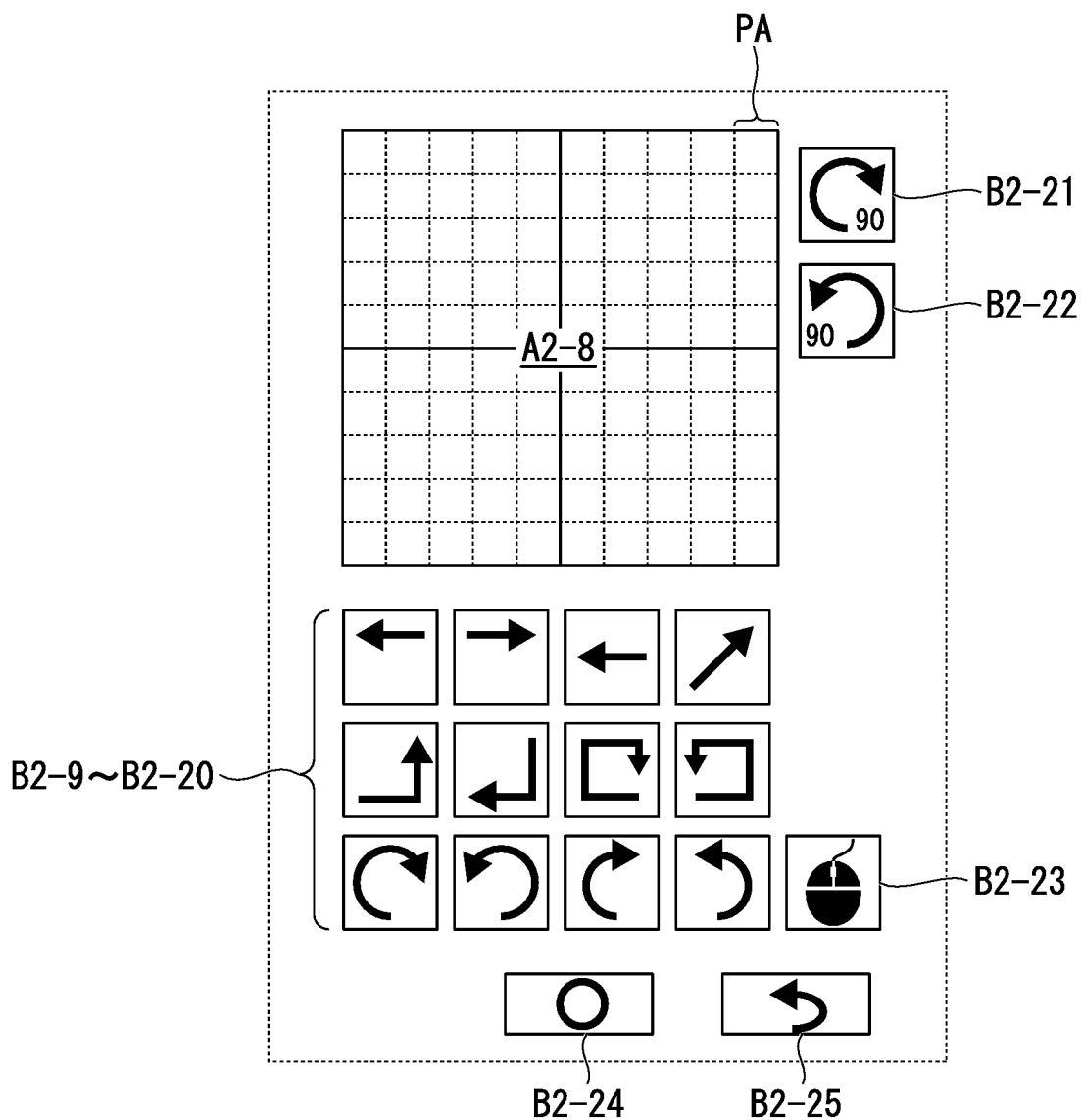
FIG. 13 is an enlarged view of a movement locus input area A2-7.

FIG. 13 is an enlarged view of the movement locus input area A2-7. An input operation performed on the movement locus input area A2-7 is acquired as information for specifying the position of the virtual vibration source by the position acquisition part 41A. In the movement locus input area A2-7, movement locus selection buttons B2-9 to B2-20 for selecting any one of prepared candidates for the movement locus are provided. As the candidates for the movement locus, movement locus such as "movement from the right to the left in the vicinity of an upper side of the vibration reproduction device 100 (see FIG. 5)" and vice versa, "movement of the center of the vibration reproduction device 100 from the right to the left," "movement of the vibration reproduction device 100 from the lower left to the upper right," "movement in an L shape," "substantially one rotation in a linear shape," "¾ of a rotation or half of a rotation in substantially a circular arc shape," etc. are prepared. When the user operates the movement locus selection button, the movement locus corresponding to the operated button is displayed in a movement locus display area A2-8 by the position display controller 41C.

In addition, in the movement locus input area A2-7, buttons B2-21 and B2-22 for rotating the movement locus itself, for example, 90 degrees clockwise or counterclockwise are provided. In addition, in the movement locus input area A2-7, a handwriting input button B2-23 is provided. When the user operates the handwriting input button B2-23, it is possible to draw the movement locus in the movement locus display area A2-8 by handwriting using a mouse, a touch pad, a touch panel, or the like. When the position acquisition part 41A acquires a drawing result of the user, the position display controller 41C makes the movement locus according to the drawing result to be displayed in the movement locus display area A2-8.

Figure 14:
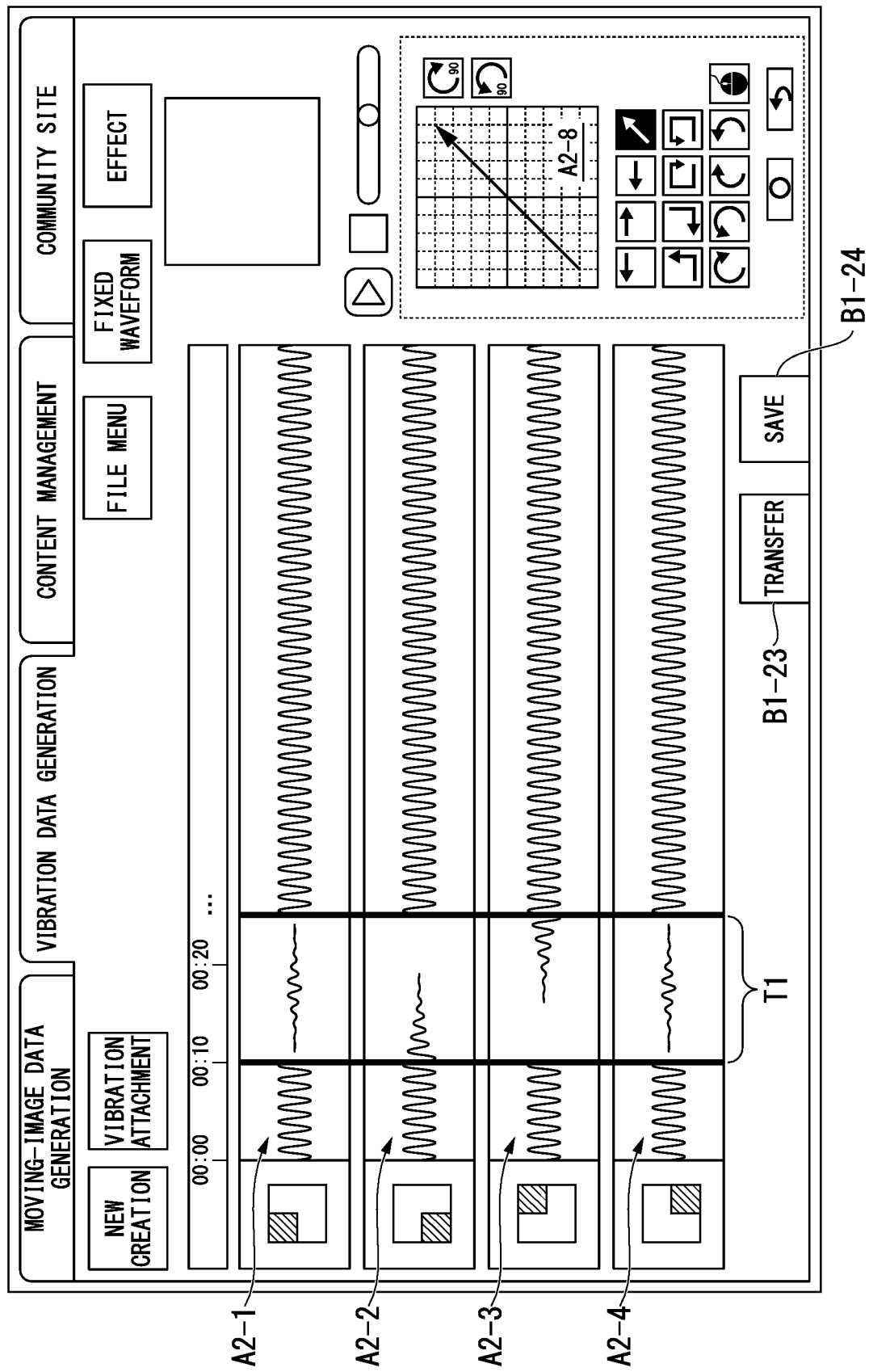
FIG. 14 is a view illustrating an example of a vibration data generation screen after a movement locus selection button for "moving from the lower left to the upper right" is operated.
Figure 15:
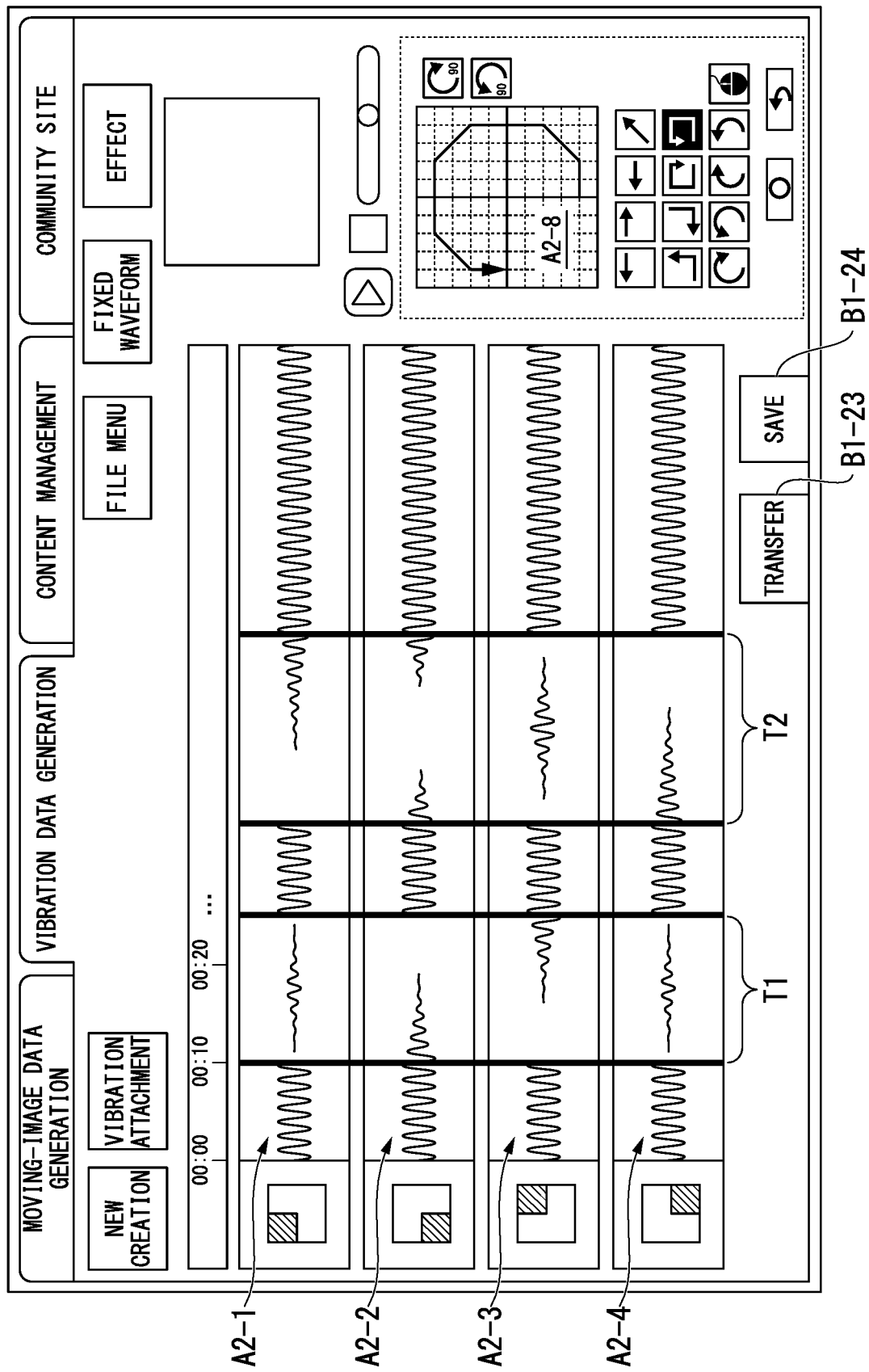
FIG. 15 is a view illustrating an example of a vibration data generation screen after a movement locus selection button for "performing ¾ rotation in substantially a circular arc shape" is operated in a time section T2 which comes after a time section T1.

When the user operates a decision button B2-24, a vibration pattern for implementing a movement locus selected or drawn at that time is generated by a vibrator-specific vibration pattern generation part 41B and reflected in the areas A2-1 to A2-4 (see FIGS. 14 and 15). The vibrator-specific vibration pattern generation part 41B, for example, decomposes the movement locus into movement between partial areas PA having a grid shape in the movement locus display area A2-8 (see FIG. 13), reads a vibration pattern of each vibrator obtained in advance in correspondence with the movement between the PAs from the vibration pattern template data 32, and generates the vibration pattern of each vibrator corresponding to the movement locus by connecting the read vibration pattern. Even when the user operates a handwriting input button B2-23 to draw the movement locus in the movement locus display area A2-8 by handwriting, the vibrator-specific vibration pattern generation part 41B similarly generates the vibration pattern of each vibrator by decomposing the movement locus into movement between the PAs having the grid shape in the movement locus display area A2-8 and reading a vibration pattern of each vibrator obtained in advance in correspondence with the movement between the PAs.

Also, when the user, for example, has designated only one stationary point by operating the handwriting input button B2-23, the vibrator-specific vibration pattern generation part 41B generates the vibrator-specific vibration pattern so that the vibration pattern in which the relevant point serves as the virtual vibration source continues between the designated time sections.

FIG. 14 is a view illustrating an example of a vibration data generation screen after a movement locus selection button for "moving from the lower left to the upper right" is operated. In FIG. 14, a corresponding movement locus is displayed in the movement locus display area A2-8. In addition, in the time section T1 designated in advance by the user in the areas A2-1 to A2-4, a preview of a vibration pattern for enabling a virtual vibration source to implement "moving from the lower left to the upper right" in the vibration reproduction device 100 is displayed.

Also, the vibration pattern template data 32 may include information in which movement locus selection buttons B2-9 to B2-20 and a series of movements between the PAs are associated or may be information in which the movement locus selection buttons B2-9 to B2-20 and the vibration pattern are directly associated. In addition, when the user operates the button B2-25 illustrated in FIG. 13, the movement locus selected or drawn at that time is canceled and the state returns to the last state.

FIG. 15 is a view illustrating an example of a vibration data generation screen after a movement locus selection button for "performing ¾ of a rotation in substantially a circular arc shape" is operated in a time section T2 which comes after a time section T1. In FIG. 15, the corresponding movement locus is displayed in the movement locus display area A2-8. Furthermore, in the time section T2 designated in advance in the areas A2-1 to A2-4, a vibration pattern for enabling a virtual vibration source to implement "performing ¾ of a rotation in substantially a circular arc shape" in the vibration reproduction device 100 is displayed in a preview type.

When the user inputs the movement locus by selecting a short time section, a movement speed of the virtual vibration source becomes relatively fast. In contrast, when the user inputs the movement locus by selecting a long time section, a movement speed of the virtual vibration source becomes relatively slow. Thereby, the user can change the movement speed of the virtual vibration source.

Through the related process, the user can generate vibration data including a vibration pattern for implementing the movement of the position of the virtual vibration source using a simple operation. As a result, for example, it is possible to implement a more advanced realistic sensation by creating vibration data including a vibration pattern for implementing "movement of the virtual vibration source from the right to the left" as vibration data to be reproduced after performing a link with display of a moving image in which the vehicle runs from the right side of the screen to the left side.

Figure 16:
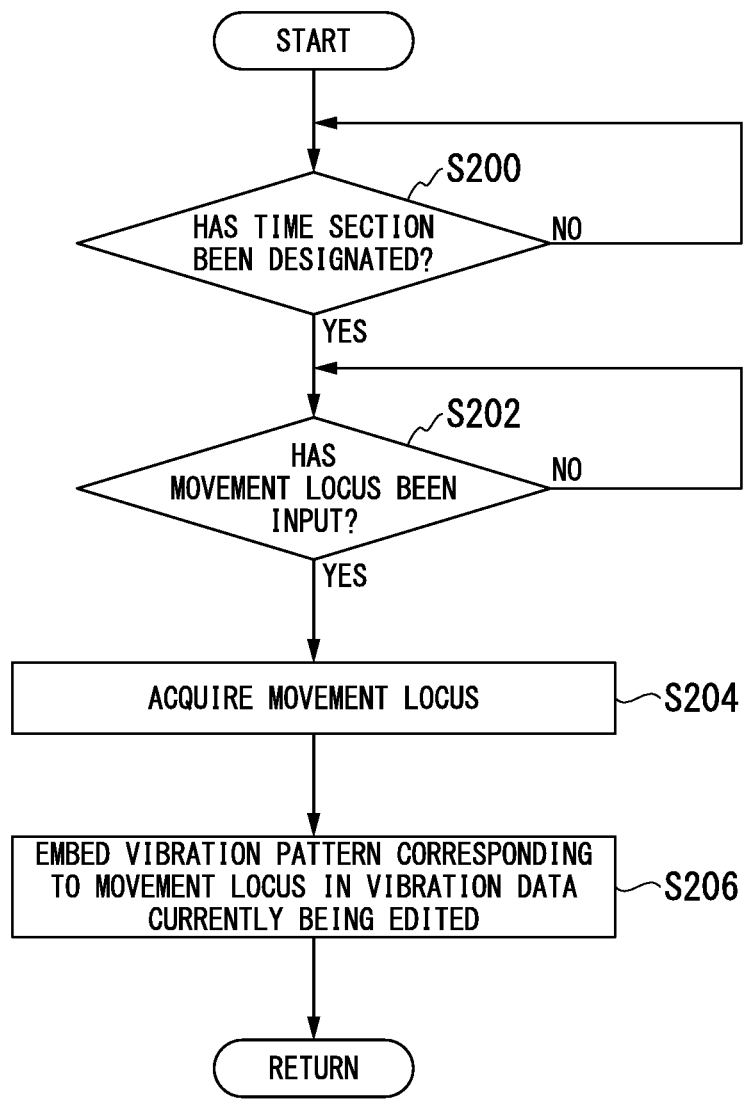
FIG. 16 is an example of a flowchart illustrating a flow of a process to be executed by the vibration data generation device of this embodiment.

FIG. 16 is an example of a flowchart illustrating a flow of a process to be executed by the vibration data generation device 1 of this embodiment. The process of the flowchart of FIG. 16, for example, starts when desired vibration data is read and a vibration pattern based on the vibration data is displayed in the areas A2-1 to A2-4.

First, the position acquisition part 41A (see FIG. 7) of the vibration data generation device 1 waits until a time section is designated (step S200). Also, there may be a case in which the designation of the time section is performed by the user's operation and a case in which the designation of the time section is performed regardless of the user's operation, for example, such as a case in which a first time section is automatically designated in an initial state.

When the time section is designated, the position acquisition part 41A waits until the movement locus is input (step S202).

When the movement locus is input, the vibrator-specific vibration pattern generation part 41B acquires a movement locus received by the position acquisition part 41A (step S204) and the vibration pattern corresponding to the movement locus is embedded in vibration data currently being edited (step S206).

The user operates the transfer button B1-23 in the vibration generation screen, so that the vibration data currently being edited is not saved in the vibration data generation device 1, but can be transferred to the vibration reproduction device 100.

In addition, the user operates the save button B1-24, thereby saving the vibration data currently being edited as the content data 33 in the storage part 30 of the vibration data generation device 1 after a change in the format in which the vibration data can be attached to moving-image data.

The change to the format in which the vibration data can be attached to the moving-image data requires some processing time. Thus, in order to cope with the case in which the user desires to cause the vibration reproduction device 100 to reproduce vibration data currently being created, a mechanism capable of rapidly transferring the vibration data to the vibration reproduction device 100 by operating the transfer button B1-23 is provided.

In addition to a process of obtaining vibration pattern from the movement locus and displaying the obtained vibration data in the vibration generation screen, a process of obtaining the movement locus from the given vibration pattern and displaying the obtained movement locus may be performed. In this case, the vibration data generation part 41 may virtually reproduce the vibration and display a position of the virtual vibration source at each reproduction time or display a position of the virtual vibration source at a time designated by the user.

Figure 17:
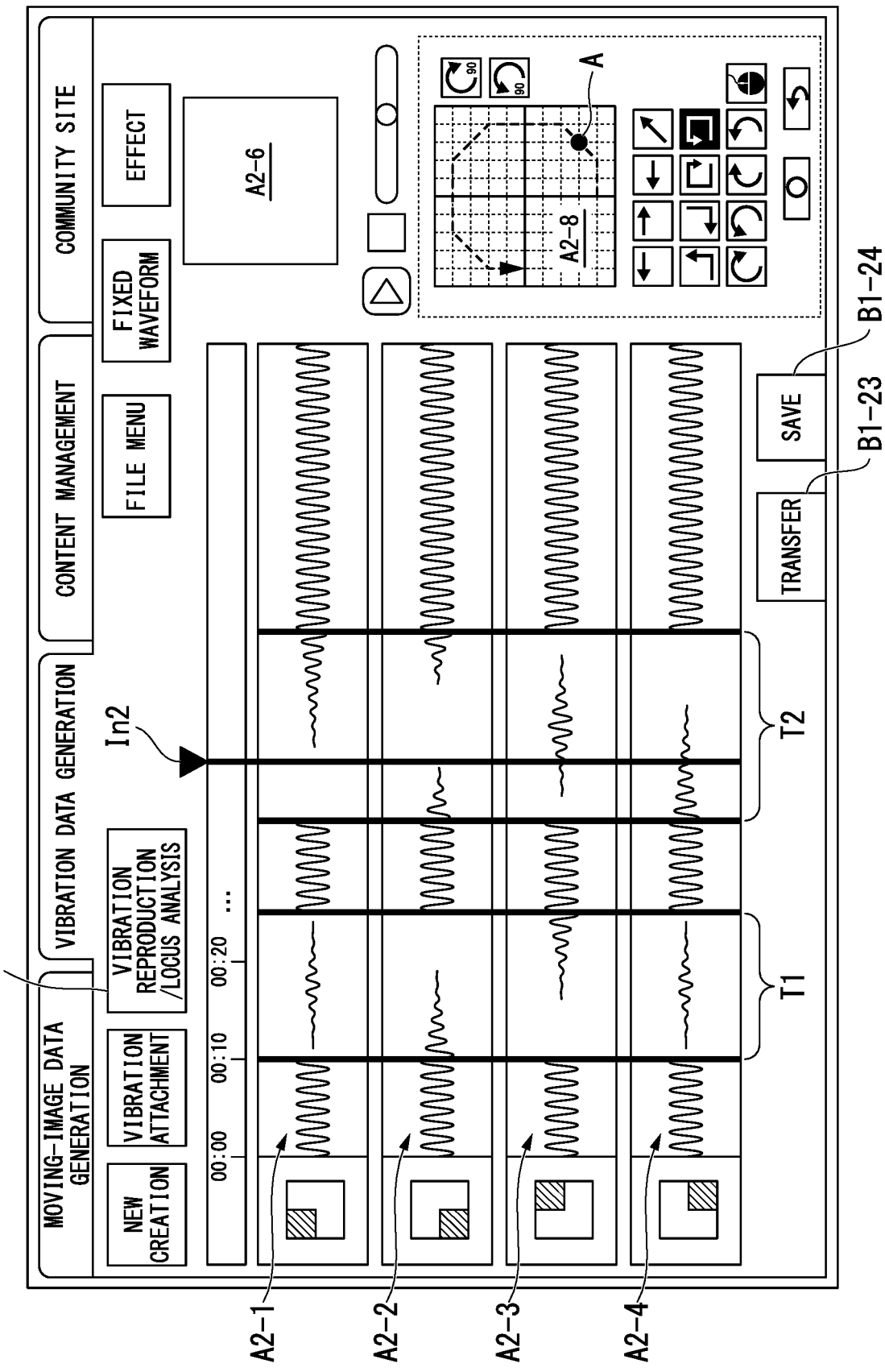
FIG. 17 is a view illustrating another example of the vibration generation screen.

FIG. 17 is a view illustrating another example of the vibration generation screen. In FIG. 17, when a vibration reproduction/locus analysis button B2-26 is operated, the vibration data edited at that time is virtually reproduced and the position A of the virtual vibration source calculated from the vibration pattern of each vibrator corresponding to a reproduction time is displayed in a movement locus display area A2-8. As a result, the position A of the virtual vibration source moves according to movement of the indicator In2 indicating the reproduction position of the vibration.

The vibration data may or may not be obtained from the movement locus. In the latter case, the vibration data generation part 41 obtains the position of the virtual vibration source at each reproduction time as a center of gravity obtained by weighting a position of the vibrator by amplitude as described above. The position A of the virtual vibration source is not limited to the movement locus display area A2-8 and may be superimposed on a moving image to be reproduced in the area A2-6 in which the moving image is reproduced and displayed by synchronizing the reproduction time.

In addition, when the vibration data is associated with a moving image or music, the vibration data generation part 41 may reproduce the moving image or music and indicate a reproduction time of corresponding vibration data by the indicator In2.

In addition, the vibration data generation part 41 may change a color or size of the preview according to an intensity of vibration of each vibrator. For example, the vibration data generation part 41 compares a sum of amplitudes of the vibrators with a threshold value and may perform pop-up display by enlarging the areas A2-1 to A2-4 when the sum is greater than the threshold value or change the color of the areas A2-1 to A2-4 to a specific color. Thereby, the user can more intuitively recognize a magnitude of vibration.

[Content Management and Community Site]

Figure 18:
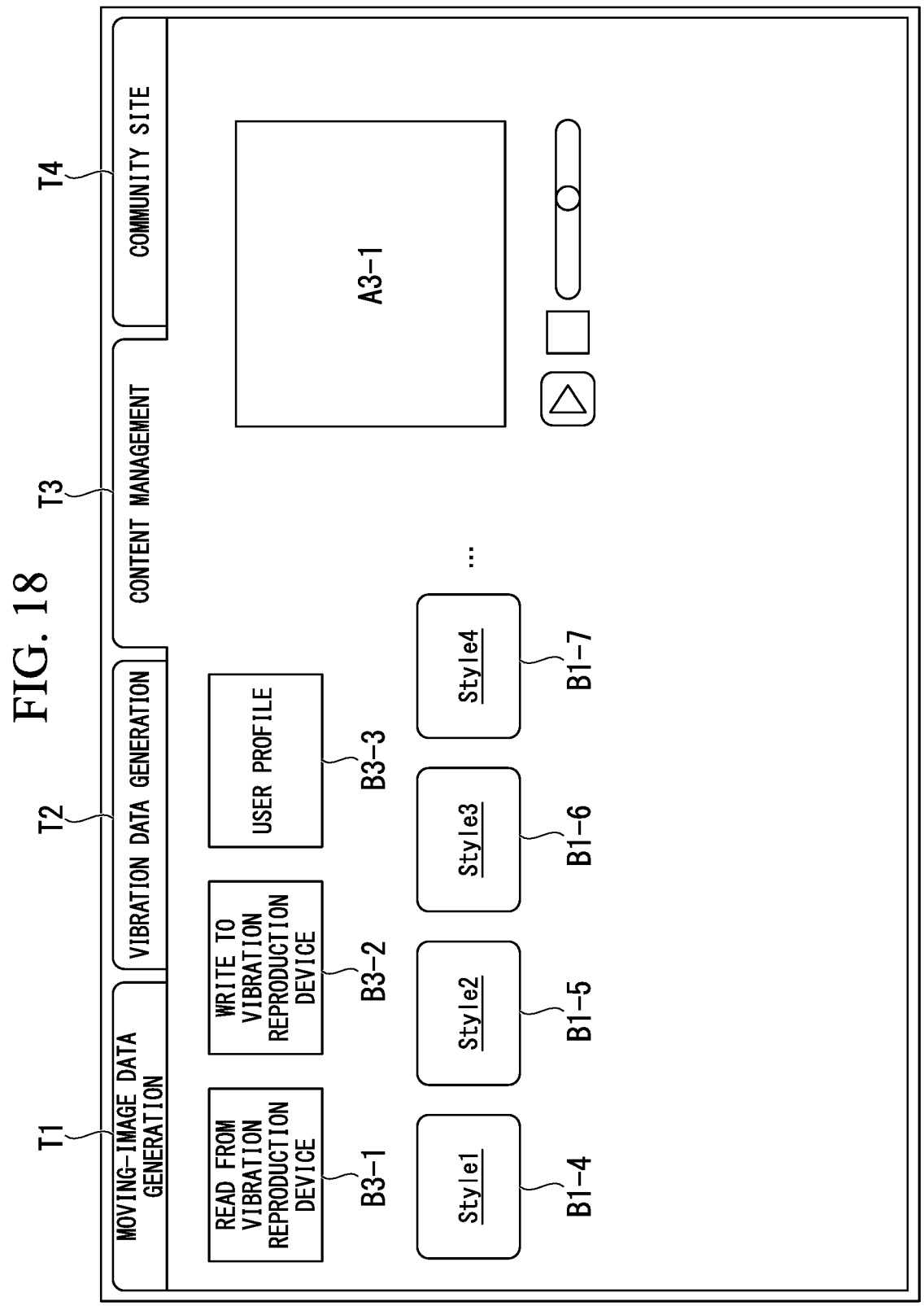
FIG. 18 is a view illustrating an example of a content management screen.

When a tab T3 is operated, the content management part 42 is activated and a content management screen is displayed. FIG. 18 is a view illustrating an example of the content management screen. When the user operates a read button B3-1 in the content management screen, the content data 162 (see FIG. 2) from the vibration reproduction device 100 is read. As the content data 162, a style in which a moving image or music and vibration data are associated or only vibration data may be present.

When the user operates a write button B3-2 in the content management screen, the style currently being edited or the vibration data is written to the storage part 160 of the vibration reproduction device 100 as the content data 162.

In addition, in the content management screen, a user profile button B3-3 for editing a user profile, which is registered in the storage part 160 of the vibration reproduction device 100, from the vibration data generation device 1, an area A3-1 in which the style is reproduced according to the user's operation, etc. are provided.

In addition, when a tab T4 is operated, the community site-processing part 43 is activated and a community site-processing screen (not illustrated) is displayed. The community site-processing part 43 has a web browser function and displays a community site on the web. The community site, for example, is a site capable of being browsed by a registered user among users of the vibration reproduction device 100 and is a site from which the user can browse or download an uploaded style.

CONCLUSION

According to the vibration data generation device 1 and the authoring tool 31 of this embodiment described above, it is possible to generate vibration data for reproducing a vibration pattern associated with movement of a virtual vibration source.

In addition, according to the vibration data generation device 1 and the authoring tool 31 of this embodiment, information about more complex vibration can be provided because the movement locus of a virtual vibration source generated from a specified vibration pattern is displayed on the display part 20.

While modes for carrying out the present invention have been described above using embodiments, the present invention is not limited to the embodiments. Various modifications and replacements can be made within a scope not departing from the subject matter of the present invention.

Figure 19:
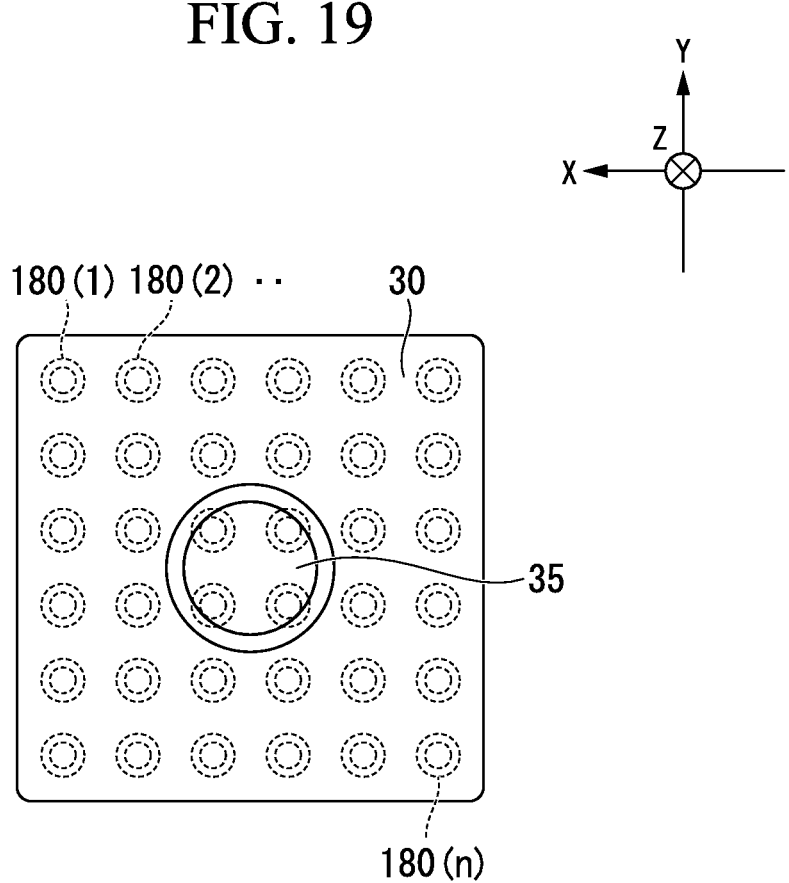
FIG. 19 is a view illustrating another example of arrangement positions of vibrators in the vibration reproduction device.

For example, vibration data generated by the vibration data generation device 1 may be for implementing actual movement of a vibration source. FIG. 19 is a view illustrating another example of arrangement positions of the vibrators in the vibration reproduction device 100. As illustrated in FIG. 19, when the vibration reproduction device 100 includes a plurality of vibrators 180(1) to 180(n) having a grid shape, the vibration data generation device 1 generates vibration data by selecting the vibrators to be vibrated in time series so that the movement locus of the vibration source input by the user is implemented.

In addition, the vibration reproduction device 100 serving as a target for which the vibration data generation device 1 generates vibration data may correspond to various devices in contact with a person at a plurality of positions such as devices having a plurality of vibrators arranged on a bed and a sofa as well as a device capable of being held in the hand.

In addition, the vibration data generated by the vibration data generation device 1 can be used in a device having a smaller number of vibrators than the vibration reproduction device 100 serving as an original target. For example, when the vibration reproduction device 100 has two vibrators on the left and right, it can be used by performing down-convert such as designating a vibration pattern obtained by combining (for example, averaging) vibration patterns of upper-left and lower-left vibrators of vibration data generated by targeting four vibrators as a vibration pattern of a left vibrator and designating a vibration pattern obtained by combining (for example, averaging) vibration patterns of upper-right and lower-right vibrators as a vibration pattern of a right vibrator.

What is claimed is:

1. A vibration data generation device that generates vibration data for a vibration reproduction device, which has a plurality of vibrators, in order to control the plurality of vibrators, the vibration data generation device comprising:
a display;
a user interface;
a memory storing instructions; and
a processor coupled to the memory and configured to execute the instructions to thereby perform operations including:
acquiring information indicating a virtual vibration source, the acquiring including
causing the display to display an input reception screen, the input reception screen displaying a plurality of candidates for a movement path of a position of the virtual vibration source, and
in response to a selection of one among the plurality of candidates based on an input to the user interface, acquiring the movement path corresponding to the selected one among the plurality of candidates for the movement path of the position of the virtual vibration source as the movement path of the position of the virtual vibration source; and
generating the vibration data based on the information indicating the virtual vibration source and the movement path of the position of the virtual vibration source, the vibration data including a vibration pattern of respective vibrators, among the plurality of vibrators of the vibration reproduction device, for reproducing the position of the virtual vibration source.

2. The vibration data generation device according to claim 1, wherein the operations further include selecting amplitudes of the respective vibrators so that the position of the virtual vibration source is a sum of respective amplitudes, of the selected amplitudes, multiplied by corresponding coordinate positions of the respective vibrators.

3. The vibration data generation device according to claim 1, wherein the operations further include
reading a vibration pattern corresponding to the candidate for the movement path of the position of the virtual vibration source, among vibration patterns of the plurality of vibrators stored in the memory, and
generating the vibration data based on the read vibration pattern.

4. The vibration data generation device according to claim 1,
wherein the vibration reproduction device has substantially a rectangular shape, and
wherein the respective vibrators are disposed, respectively, in a vicinity of four corners of the rectangular shape.

5. The vibration data generation device according to claim 1, wherein the operations further include causing the display to display the position of the virtual vibration source during reproduction of the vibration pattern of the plurality of vibrators.

6. The vibration data generation device according to claim 5, wherein the operations further include causing the display to display a visual representation of the acquired vibration pattern associated with the virtual vibration source according to an intensity of vibration at a reproduction time in the vibration pattern.

7. The vibration data generation device according to claim 1, wherein the operations further include:
acquiring a time section designation for a moving image, and
embedding the generated vibration data in the designed time section for the moving image.

8. A vibration data generation device that generates vibration data for a vibration reproduction device, which has a plurality of vibrators, in order to control the plurality of vibrators, the vibration data generation device comprising:
- a display;
- a user interface;
- a memory storing instructions; and
- a processor coupled to the memory and configured to execute the instructions to thereby perform operations including:
  - acquiring information indicating a virtual vibration source, the acquiring including
    - causing the display to display an input reception screen, the input reception screen displaying a drawing input button and an area permitting a user to manually draw, by selecting the drawing input button and providing an input to the area via the user interface, a path indicating a movement path of a position of the virtual vibration source, and
    - acquiring the movement path of the position of the virtual vibration source based on the input to the user interface, and
  - causing the display to display a visual representation of the movement path of the position of the virtual vibration source, and
  - generating the vibration data based on the information indicating the virtual vibration source and the movement path of the position of the virtual vibration source, the vibration data including a vibration pattern of respective vibrators, among the plurality of vibrators of the vibration reproduction device, for reproducing the position of the acquired virtual vibration source.

9. The vibration data generation device according to claim 8, wherein the visual representation is a line indicating movement across a plurality of positions of the virtual vibration source included in the movement path.

10. A vibration data generation program for causing a computer to generate vibration data for a vibration reproduction device, which has a plurality of vibrators, in order to control the plurality of vibrators, the computer including a display, a user interface, a memory storing the vibration data generation program, and a processor coupled to the memory and configured to execute the vibration data generation program to thereby perform operations including:
- acquiring information indicating a virtual vibration source, the acquiring including
  - causing the display to display an input reception screen, the input reception screen displaying a plurality of candidates for a movement path of a position of the virtual vibration source, and
  - in response to a selection of one among the plurality of candidates based on an input to the user interface, acquiring the movement path corresponding to the selected one among the plurality of candidates for the movement path of the position of the virtual vibration source as the movement path of the position of the virtual vibration source; and
- generating the vibration data based on the information indicating the virtual vibration source and the movement path of the position of the virtual vibration source, the vibration data including a vibration pattern of respective vibrators, among the plurality of vibrators of the vibration reproduction device, for reproducing the position of the virtual vibration source.

* * * * *